United States Patent [19]

Dodge

[11] Patent Number: 4,589,861
[45] Date of Patent: May 20, 1986

[54] SIMPLE RECORDING HEAD DRIVE HAVING VIRTUALLY ZERO BACKLASH OR SLIPPAGE

[75] Inventor: Dennis W. Dodge, Amherst, N.H.

[73] Assignee: Itek Graphix Corp., Lexington, Mass.

[21] Appl. No.: 612,770

[22] Filed: May 22, 1984

[51] Int. Cl.⁴ ............................................. F16H 55/48
[52] U.S. Cl. ...................................... 474/178; 474/191
[58] Field of Search ....................... 474/178, 190, 191; 346/139 A, 135.1; 106/36, 37

[56] References Cited

U.S. PATENT DOCUMENTS

| | | | |
|---|---|---|---|
| 2,781,669 | 2/1957 | Whitesell | 474/191 |
| 3,224,381 | 12/1965 | Stewart | 474/178 X |
| 3,494,212 | 2/1970 | Thomson | 474/178 |
| 3,498,817 | 3/1970 | Stone | 474/190 |
| 4,342,504 | 8/1982 | Ebner | 354/7 |

Primary Examiner—James A. Leppink
Assistant Examiner—Thuy M. Bui
Attorney, Agent, or Firm—Morris I. Pollack; Martin P. Hoffman

[57] ABSTRACT

A non-deformable metallic pulley is coated with a urethane layer having a thickness of about 0.0005 inches. A drive belt, coupled to a recording head, is positioned over the urethane layer of the pulley, which in turn is driven by a stepping motor. The drive pulley is non-deformable, to eliminate backlash and yet has a very high coefficient of friction, about double that of steel, which is maintained consistent throughout the operation of the drive system, regardless of exposure to paper dust, dirt, oil and the like.

13 Claims, 3 Drawing Figures

SIMPLE RECORDING HEAD DRIVE HAVING VIRTUALLY ZERO BACKLASH OR SLIPPAGE

BACKGROUND OF THE INVENTION

The present invention relates to the field of recording head drive mechanisms.

In U.S. Pat. No. 4,342,504 issued to Peter Ebner and assigned to the same assignee as the present invention, a phototypesetter is disclosed having a recording head which is mounted upon a support carriage which in turn is driven by a belt drive mechanism. A flat ribbon of fiber optic elements is coupled at one terminal portion to a matrix of light emitting diodes and the other terminal portion is embedded within a recording head, which presses against the photosensitive paper for the purpose of recording a line of characters upon a single scan of the head across the paper. The fiber optic elements terminating in the recording head form two rows which enable the characters to be formed by recording character segment strips which overlap each other. The recording head is mechanically scanned across the photosensitive paper at a velocity of about 18 inches per second, and in order to accurately generate characters by selectively illuminating the light emitting diodes in the matrix, the exact position of the recording head during scanning must be precisely correlated with the L.E.D. illumination actuation data being generated, in order to accurately reproduce the desired fonts of characters of typeset quality. Thus the recording head drive mechanism ideally should have no backlash or slippage.

Accordingly it is highly desirable to reduce the backlash or slippage of a conventional belt-pulley interface to virtually zero backlash in a relatively inexpensive manner. Early attempts involved the use of urethane pulleys having a high coefficient of friction. However, it was found that the deformation of the pulleys resulted in the above mentioned detrimental backlash. The other approach was to roughen steel pulleys which are substantially non-deformable, to increase the coefficient of friction. Due to paper cutting, paper dust passes through the machine owing to the cooling fan, and such dust after a time tends to reduce the coefficient of friction where a roughened steel pulley is employed.

It is thus desirable to provide a pulley which is substantially non-deformable, in order to eliminate the above mentioned backlash, and yet has a very high, constant coefficient of friction which does not change owing to exposure to dust and dirt. Since the above mentioned character strip elements must be positioned within one half of one thousandth of an inch, regardless of the scanning speed of the head, which is typically in the neighborhood of 18 inches per second, the requirement for extremely small backlash and slippage of the head drive system is of the utmost importance to attain very high quality typesetting with an inexpensive open loop recordation system. The worker in the art in the light of these requirements, would naturally consider the design of relatively expensive closed loop servo systems which maintain fairly accurate control regardless of backlash, slippage and the like. Other approaches such as the use of precision leadscrews are also expensive and too slow for rapid line recordation.

SUMMARY OF THE INVENTION

It is thus an object of the present invention to provide a simple and inexpensive recording head drive system which virtually eliminates slippage and backlash and yet enables rapid scanning of the recording head over the photosensitive media with very high acceleration and deceleration characteristics.

It is a further object of the present invention to provide a drive system having a head positional accuracy of significantly less than ±0.0005 inches and which does not require a relatively complex or costly closed loop system or lead screw drive mechanism to attain these beneficial results.

In accordance with a preferred embodiment of the present invention, a non-deformable metallic pulley is coated with a urethane layer having a thickness of no greater than 0.0100 inches and most preferably about 0.0005 inches. The drive belt coupled to the recording head is positioned over the urethane layer of the pulley, which in turn is driven by a stepping motor. The resulting pulley is non-deformable, to eliminate backlash and yet has the requisite high coefficient of friction (about double that of steel) which is maintained consistent throughout the operation of the drive system regardless of exposure to paper dust, dirt, oil and the like.

Other objects, features and advantages of the present invention will become apparent upon study of the following description taken in conjunction with FIGS. 1-3.

SPECIFIC DESCRIPTION

Figure 1:
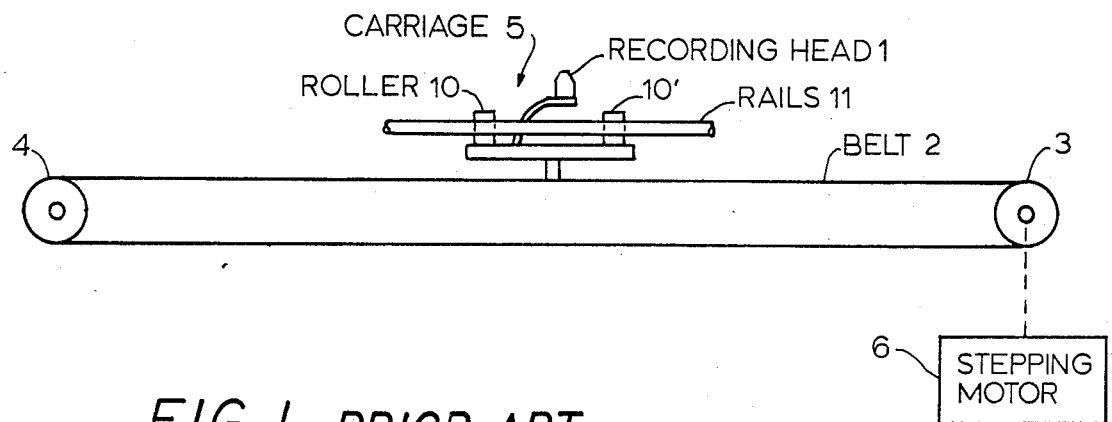
FIG. 1 is a schematic illustration of a prior art recording head, recording carriage and belt drive therefore.
Figure 2:
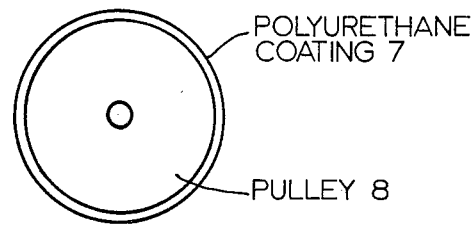
FIG. 2 is an end view of a pulley for driving the belt of the recording carriage of FIG. 1, and incorporating the instant invention.
Figure 3:
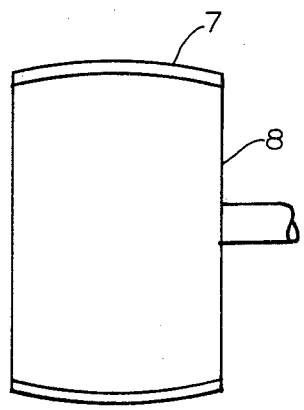
FIG. 3 is a side elevational view of the pulley of FIG. 2.

A prior art recording head drive carriage and belt drive mechanism therefore are set forth in detail in FIGS. 4 through 6 in U.S. Pat. No. 4,342,504, incorporated by reference herein. As indicated in this patent, a linear array of fiber optic elements are embedded within a recording head, which is spring loaded against the photosensitive media and is supported by a drive carriage which has roller elements which are in contact with a pair of cylindrical support rails. The carriage is driven by a belt which is in turn driven by a stepping motor via a drive pulley arrangement. This specific organization is broadly illustrated in FIG. 1, wherein recording head 1 is coupled to drive belt 2 via carriage 5 supported by rollers 10 and 10' mounted upon rail means 11. Belt 2 is in turn mounted upon drive pulley 3 and pulley 4, the former pulley in turn being driven by a stepping motor 6. A steel crown pulley 8, which replaces pulley 3 in accordance with the invention, has a coating or layer 7 of polyurethane sprayed thereon, as indicated in FIGS. 2 and 3. The crown maintains the belt in position upon the pulley and prevents it from laterally shifting. The particular process for applying the polyurethane coating or layer is known in the art, and thus will not be described in detail.

In accordance with the present invention, the layer 7 must be less than about ten thousandths of an inch thick in order to prevent shear forces from inducing deformation of the layer, to in turn produce the above mentioned backlash problems. The preferred range of thickness of the polyurethane layer is betweeen 0.5 and 3 mils and the most preferred thickness employed in the commercial embodiment of the invention was half a mil. The nature of the outside surface of the polyurethane coating is such that substantial uniformity of the very high coefficient of friction is produced, and changes in such coefficient are not apparent, in spite of the introduction of dust and dirt into the machine in part due to the use of the above mentioned cooling fan. In the commercial embodiment, the actual coating employed was urethane compound No. SC200, marketed by Rubber-/Urethanes Inc. Azusa, CA, 91702.

Surprisingly, the relatively simple mechanism of the present invention results in the virtual elimination of slippage and backlash at low cost without the need for closed loop servo systems, lead screws or the like. Contemporaries of the inventor were amazed with the results which consistently indicated backlash of no greater than 0.0005 thousandths of an inch. In the commercial embodiment of the invention, the positional accuracy of the head per scan line was often significantly less than the ±0.0005, and in fact was as low as ±0.0000346 inches. The slippage measured was as low as 0.00000392" per scan, or 10 times greater than required. It is believed that such results were never attainable, using a steel drive pulley, and amounts to virtually "zero backlash".

The belt in the commercial embodiment was made of stainless steel and had a thickness of about 2 mils.

While preferred methods and embodiments have been described, others are within the scope of the invention which is to be restricted only by a reasonable interpretation of the following claims.

I claim:

1. A drive for a recording head carriage; comprising:
   (a) drive belt means constructed to be coupled to a recording head carriage and, when so coupled, to effect a physical displacement of the recording head carriage along a predetermined path upon drive movement of said drive belt means;
   (b) drive pulley means disposed for coaction with said drive belt means to impart a drive movement thereto;
   (c) said drive pulley means including at least one drive pulley having a substantially non-deformable drive surface with a layer of elastomer applied thereto so as to be disposed between and in contact with said drive belt means, when said drive pulley means is disposed for coaction therewith;
   (d) said layer of elastomer having a predetermined thickness between 0.0005 inches and 0.0100 inches.

2. The drive of claim 1, wherein said elastomer is urethane.

3. The drive of claim 2, wherein said predetermined thickness is between 0.005 inches and 0.003 inches.

4. The drive of claim 3, wherein said predetermined thickness is 0.0005 inches.

5. The drive of claim 4 including motor means coupled to said drive pulley means to drive same.

6. The drive of claim 5, wherein said drive pulley drive surface is formed with a crowned configuration.

7. The drive of claim 6, wherein said drive pulley means includes an idler pulley disposed in spaced relationship with said drive pulley and for coaction with said drive belt means.

8. The drive of claim 6, wherein said idler pulley has a pulley surface with a crowned configuration.

9. The method of forming a drive pulley; comprising:
   (a) forming a pulley with a predetermined substantially nmon-deformable drive surface;
   (b) applying a coating of elastomer of predetermined thickness to said pulley drive surface;
   (c) said predetermined thickness of said elastomer coating being less than 0.0100 inches.

10. The method of claim 9, wherein said elastomer is urethane.

11. The method of claim 10, wherein said predetermined thickness is less than 0.003 inches.

12. The method of claim 11, wherein said predetermined thickness is 0.0005 inches.

13. The method of claim 12, wherein said elastomer is applied by spraying.

* * * * *